United States Patent
Ookawa et al.

(10) Patent No.: US 9,605,588 B2
(45) Date of Patent: Mar. 28, 2017

(54) AIR INTAKE PATHWAY STRUCTURE FOR INTERNAL COMBUSTION ENGINE

(71) Applicant: NISSAN MOTOR CO., LTD., Yokohama-shi, Kanagawa (JP)

(72) Inventors: Takeshi Ookawa, Kanagawa (JP); Kiyoshi Ikegaya, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/025,581

(22) PCT Filed: Aug. 6, 2014

(86) PCT No.: PCT/JP2014/070717
§ 371 (c)(1),
(2) Date: Mar. 29, 2016

(87) PCT Pub. No.: WO2015/056479
PCT Pub. Date: Apr. 23, 2015

(65) Prior Publication Data
US 2016/0237881 A1    Aug. 18, 2016

(30) Foreign Application Priority Data
Oct. 18, 2013    (JP) .................................. 2013-217135

(51) Int. Cl.
*F02M 35/00*    (2006.01)
*F02B 37/16*    (2006.01)
(Continued)

(52) U.S. Cl.
CPC .......... *F02B 37/16* (2013.01); *F02B 29/0406* (2013.01); *F02M 35/10013* (2013.01);
(Continued)

(58) Field of Classification Search
CPC ................. F02B 29/0406; F02B 37/16; F02M 35/10013; F02M 35/10019; F02M 35/10157; F02M 35/10386
(Continued)

(56) References Cited

U.S. PATENT DOCUMENTS 4,817,387 A * 4/1989 Lashbrook .............. F02B 37/16
60/600
4,848,281 A * 7/1989 McCord .................. F02B 27/00
123/184.58
(Continued)

FOREIGN PATENT DOCUMENTS

JP    58-027812 A    2/1983
JP    59-115864    8/1984
(Continued)

*Primary Examiner* — Marguerite McMahon
*Assistant Examiner* — Tea Holbrook
(74) *Attorney, Agent, or Firm* — Drinker Biddle & Reath LLP

(57) ABSTRACT

A supercharger (15) is provided with a bypass pathway (17). A backflow preventer (20) is provided to the air intake pathway (8) between an airflow meter (10) and the bypass pathway (17). The backflow preventer (20) has: a casing (41) formed by locally expanding the cross-sectional area of the air intake pathway; and an inner tube (42) substantially constructing a duct for the mainstream of air intake. The inner tube (42) is supported by a flange portion (50) and the downstream end (42a) opens within the casing (41). During backflow when the bypass pathway (17) opens, a portion of the intake air enters into an exit-side space section (55), and the flow is prevented by the flange portion (50). Consequently, reverse flow is suppressed.

6 Claims, 7 Drawing Sheets

(51) Int. Cl.
*F02M 35/10* (2006.01)
*F02B 29/04* (2006.01)

(52) U.S. Cl.
CPC *F02M 35/10019* (2013.01); *F02M 35/10157* (2013.01); *F02M 35/10386* (2013.01); *Y02T 10/144* (2013.01)

(58) Field of Classification Search
USPC .............................. 123/184.21, 559.1, 564
See application file for complete search history.

(56) References Cited

U.S. PATENT DOCUMENTS

| | | | |
|---|---|---|---|
| 6,945,048 B2* | 9/2005 | Whiting | F02B 29/0406 123/559.1 |
| 8,950,183 B2* | 2/2015 | Nixon | F02B 31/00 415/116 |
| 2010/0154757 A1* | 6/2010 | Miyamoto | F02D 11/105 123/559.1 |
| 2012/0023930 A1* | 2/2012 | Lischer | F02B 37/00 60/598 |
| 2014/0325983 A1* | 11/2014 | Tsunooka | F02D 9/02 60/602 |

FOREIGN PATENT DOCUMENTS

| | | |
|---|---|---|
| JP | 61-183427 | 11/1986 |
| JP | 61-291727 A | 12/1986 |
| JP | H06-10682 A | 1/1994 |
| JP | 2522650 | 1/1997 |
| JP | 2003-120446 | 4/2003 |
| JP | 2009-209784 A | 9/2009 |

* cited by examiner

AIR INTAKE PATHWAY STRUCTURE FOR INTERNAL COMBUSTION ENGINE

TECHNICAL FIELD

The present invention relates to an air intake pathway structure for internal combustion engine, and more particularly to an air intake pathway structure for an internal combustion engine equipped with a supercharger downstream from an air flow meter and equipped with a bypass pathway and a bypass valve for allowing downstream and upstream sides of the supercharger to come in communication with each other.

BACKGROUND OF THE INVENTION

Concerning an internal combustion engine equipped with a supercharger in an air intake pathway, there has been known such a configuration as to be equipped with a bypass pathway for allowing downstream and upstream sides of a supercharger to come in communication with each other and also equipped with a bypass valve which can open or close the bypass pathway. Patent Document 1 discloses an arrangement where the bypass pathway is provided in parallel with a mechanical supercharger perpetually driven by the engine output so that the bypass valve disposed within the bypass pathway is opened during a low load state to relieve the supercharging pressure. Patent Document 2 discloses an arrangement where the bypass pathway is provided in parallel with a mechanical supercharger driven according to engine-operating conditions and the supercharging pressure is controlled by the opening degree of the bypass valve.

In the above-mentioned arrangement including a bypass pathway which allows the downstream and upstream sides of the supercharger to come in communication with each other, when the bypass valve opens and an intake air is put into circulation from the downstream side of the supercharger to the upstream side of the supercharger, a portion of the intake air may sometimes flow back to the more upstream side of the air intake pathway so as to reach to an air flow meter. Hence there has been a problem that if the air flow meter has good responsivity the backflow components may be detected by the air flow meter to cause some errors.

REFERENCES ABOUT PRIOR ART

Patent Documents

Patent Document 1: Japanese Patent Application Publication No. H06-10682
Patent Document 2: Japanese Patent Application Publication No. 2009-209784

SUMMARY OF THE INVENTION

An object of the present invention is to suppress the reverse flow which may occur between the bypass pathway and the air flow meter.

An air intake pathway structure for internal combustion engine, according to the present invention is based on the assumption that the internal combustion engine is equipped with a supercharger downstream from an air flow meter in an air intake pathway and equipped with a bypass pathway and a bypass valve for allowing downstream and upstream sides of the supercharger to come in communication with each other. The air intake pathway structure is configured to include: an extended section formed by locally expanding the cross-sectional area of the pathway and located at a part of the air intake pathway and between a meeting point where the air intake pathway meets the bypass pathway and the air flow meter; and an inner tube inside the extended section, the downstream end of which is formed opening toward an exit section of the extended section, wherein the inner tube and an inner wall surface of the extended section define a space section therebetween, the space section having an upstream side blocked by a partition and a downstream side opening inside the extended section.

In the above-mentioned configuration, the intake air stream flows within the inner tube even at the extended section when the intake air flows appropriately in the forward direction, and then flows downstream toward the supercharger. Meanwhile, when the intake air tends to flow back through the bypass pathway, a part of the intake air inevitably enters into the interior of the inner tube through the downstream end of the inner tube but another part of the intake air enters into the space section defined between the inner tube and an inner wall surface of the extended section thereby being blocked from backflow by the partition. Consequently, a reverse flow directed toward the air flow meter is relieved.

According to the present invention, it becomes possible to suppressing reverse flow of the intake air without increasing the intake resistance when the intake air flows in the forward direction. With this, the influence of backflow upon the output of the air flow meter.

MODE(S) FOR CARRYING OUT THE INVENTION

Hereinafter, an embodiment of the present invention will specifically be explained by reference to the accompanying drawings.

Figure 1:
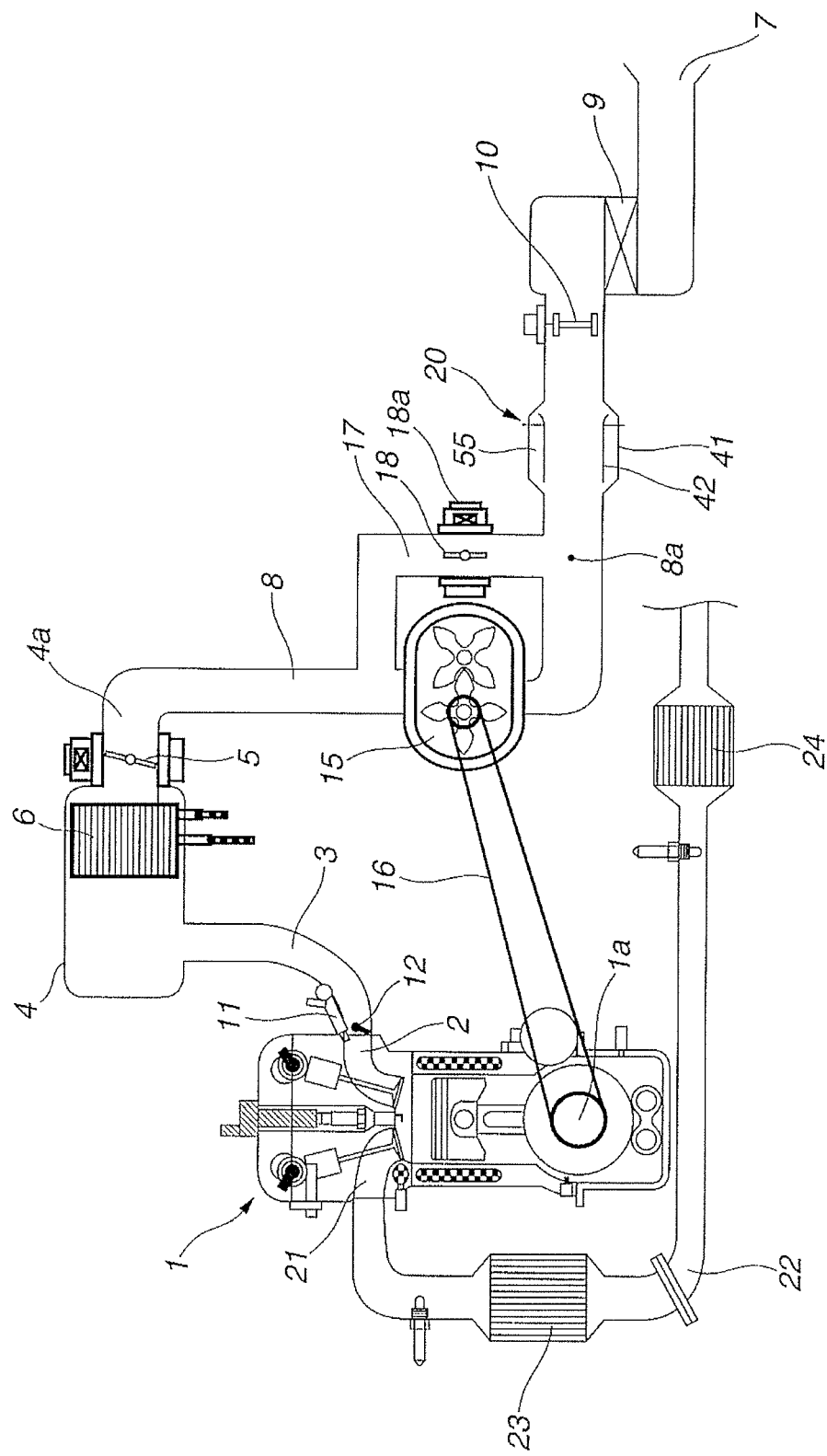
FIG. 1 An illustration for explaining the overall structure of an internal combustion engine provided having an embodiment of an air intake pathway structure according to the present invention.

FIG. 1 is an illustration for schematically explaining the structure of an intake and an exhaust system of the whole of an internal combustion engine to which the present invention is applied. Internal combustion engine 1 is a spark ignition gasoline engine, for example, in which intake collector 4 is connected to air intake port 2 of each cylinder through branch passage 3 and throttle valve 5 of an electric control type is disposed at entrance portion 4a of intake collector 4. In the interior of intake collector 4, there is provided water-cool intercooler 6 for cooling a supercharged intake air. Fuel injection valve 11 and tumble control valve 12 are disposed at air intake port 2.

In air intake pathway 8 ranging from entrance portion 4a of intake collector 4 to an upstream end (or outside-air inlet 7), air cleaner 9 is provided located on a relatively upstream side while air flow meter 10 (of a hot-wire type, for example) is disposed immediately behind the air cleaner 9 (or at an outlet of the air cleaner 9). In the present invention, the air cleaner 9 is not necessarily limited to those of the hot-wire type.

Supercharger 15 is disposed between air flow meter 10 and throttle valve 5 in air intake pathway 8. In the present embodiment, a mechanical supercharger and more specifically a four-lobe Roots blower is employed as supercharger 15, which is adapted to perpetually be driven by crankshaft 1a of internal combustion engine 1 through belt transmission mechanism 16. Incidentally, the present invention may be applied to a case of using any other styles of mechanical superchargers such as a Lysholm type supercharger, and additionally to a case of using a turbocharger. Furthermore, such an arrangement as to drive a mechanical supercharger through an electromagnetic clutch only at the time of supercharging is also acceptable.

The above-mentioned air intake pathway 8 is provided with supercharger 15, and bypass pathway 17 disposed parallel thereto. More specifically, bypass pathway 17 is provided to bring the downstream and the upstream sides of supercharger 15 in communication with each other. Bypass valve 18 of a butterfly valve type, for example, is placed interposing into the bypass pathway 17. This bypass valve 18 is adapted to perform opening/closing action based on signals from an engine controller (not shown) through actuator 18a. In the state of bypass valve 18 opening, the intake air supercharged by supercharger 15 is partially refluxed through bypass pathway 17 to the upstream side (or inlet side) of supercharger 15. With this, the supercharging pressure is restrained from increasing while energy to be expended for driving supercharger 15 is saved. Bypass valve 18 may be arranged to be switched between a non-supercharging region and a supercharging region in internal combustion engine 1 like an on-off switch, or it may be arranged to continuously control its opening degree in order to control the supercharging pressure.

Between bypass pathway 17 and air flow meter 10 in air intake pathway 8, and more specifically between meeting point 8a at which the outlet of bypass pathway 17 meets air intake pathway 8 and air flow meter 10, there is provided backflow preventer 20, which is an essential part of the present invention for suppressing reverse flow of the intake air attempting to flow from bypass pathway 17 toward air flow meter 10 when bypass valve 18 is in the state of opening. This backflow preventer 20 is provided to have an inner tube inside an extended section formed by locally expanding the cross-sectional area of the pathway, and configured to define a space section which opens toward the downstream side between them as discussed below.

Exhaust pathway 22 connected to exhaust port 21 of internal combustion engine 1 is provided with upstream-side catalytic converter 23 and downstream-side catalytic converter 24, each of which is formed having a three-way catalyst and the like.

Then, a configuration of the above-mentioned backflow preventer 20 will specifically be explained by reference to FIGS. 2 to 7.

Figure 2:
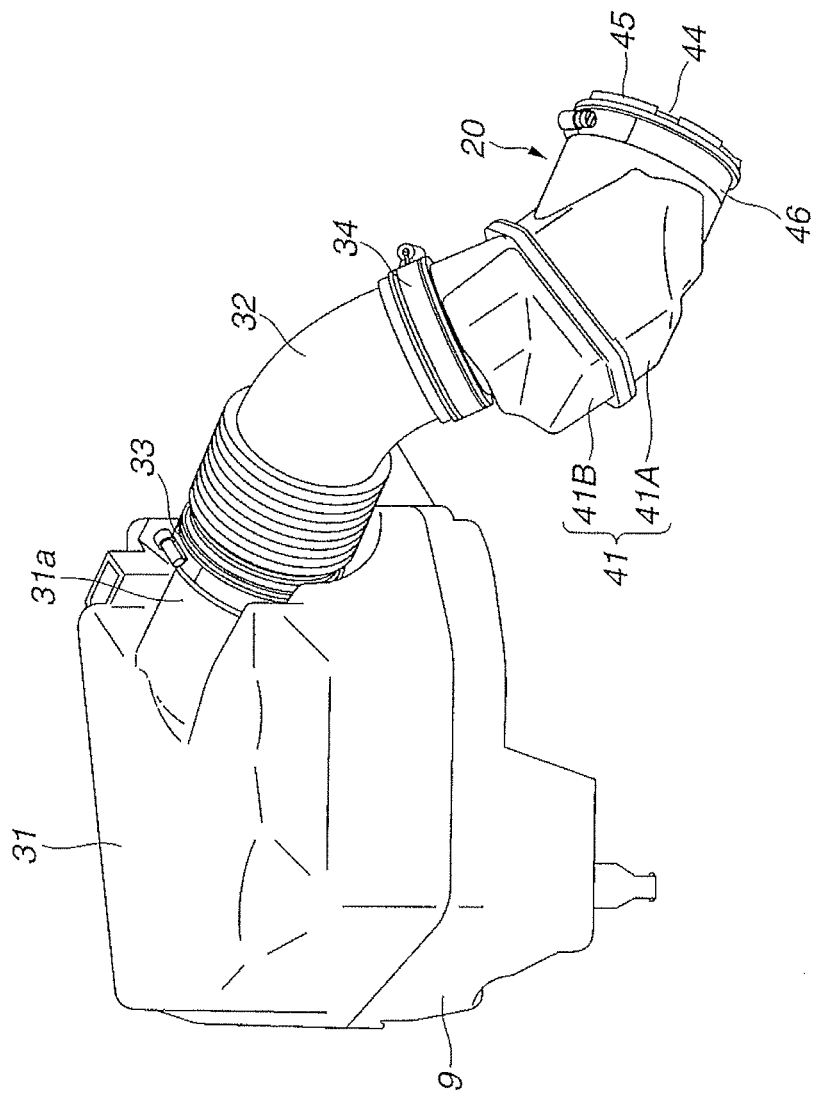
FIG. 2 A perspective view of an essential part of an embodiment of the air intake pathway structure.
Figure 3:
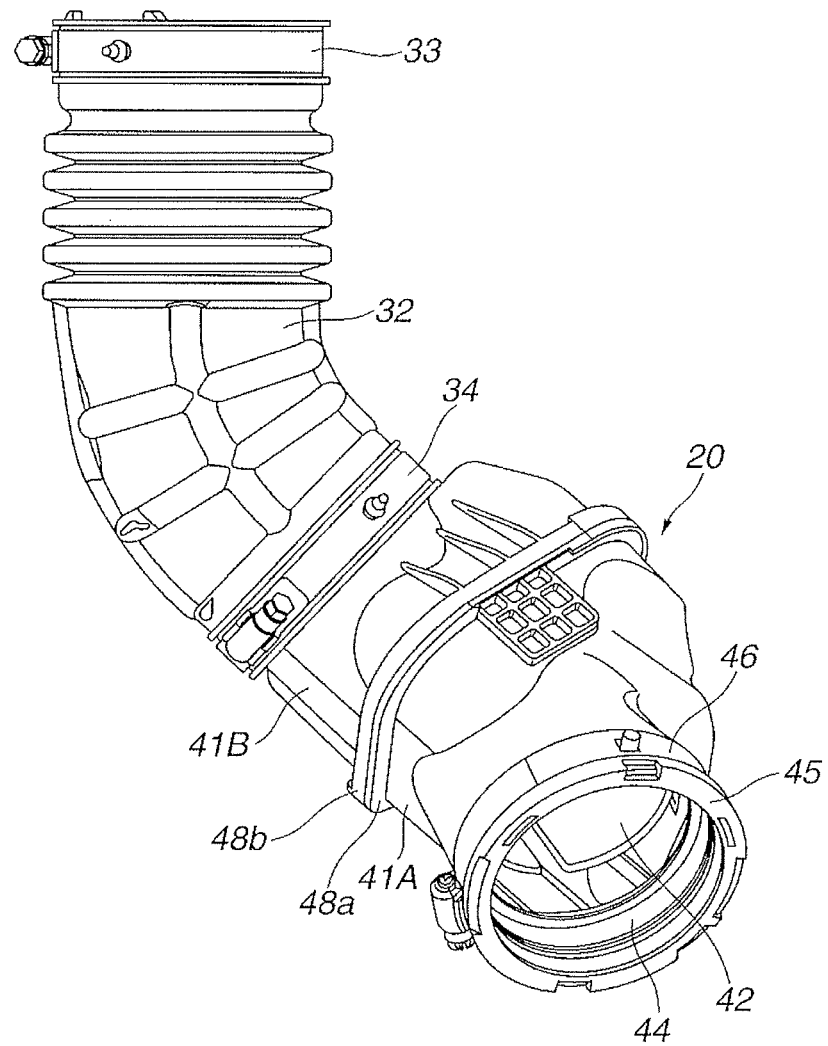
FIG. 3 A perspective view showing an embodiment of a backflow preventer together with an air intake duct.

FIG. 2 shows backflow preventer 20 connected to case 31 of air cleaner 9 through air intake duct 32 formed of rubber, while FIG. 3 shows backflow preventer 20 and air intake duct 32 detached from air cleaner 9. The air intake duct 32 is connected at its upstream end to cylindrically-shaped exit part 31a of case 31 of air cleaner 9, and the above-mentioned air flow meter 10 is attached to the exit part 31a of case 31 (though not shown in FIG. 2). Air intake duct 32 is shaped to curve slightly as shown in FIG. 3, the upstream end of which is connected to exit part 31a of case 31 by metal clamping band 33 while the downstream end is connected to backflow preventer 20 by metal clamping band 34.

Figure 4:
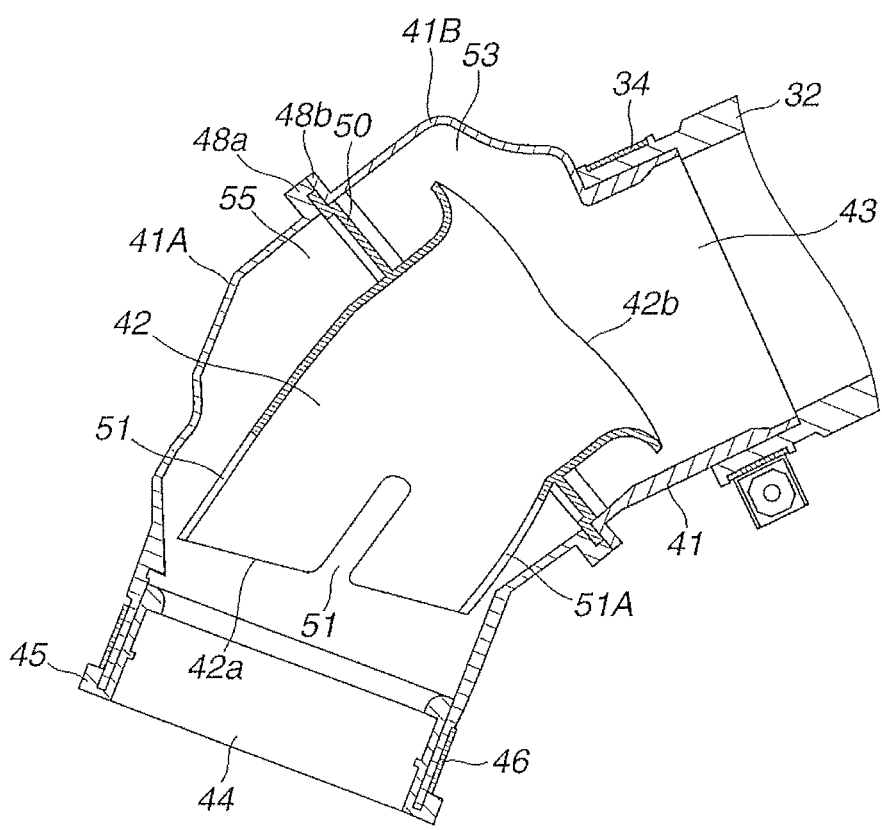
FIG. 4 A cross-sectional view of the backflow preventer.
Figure 5:
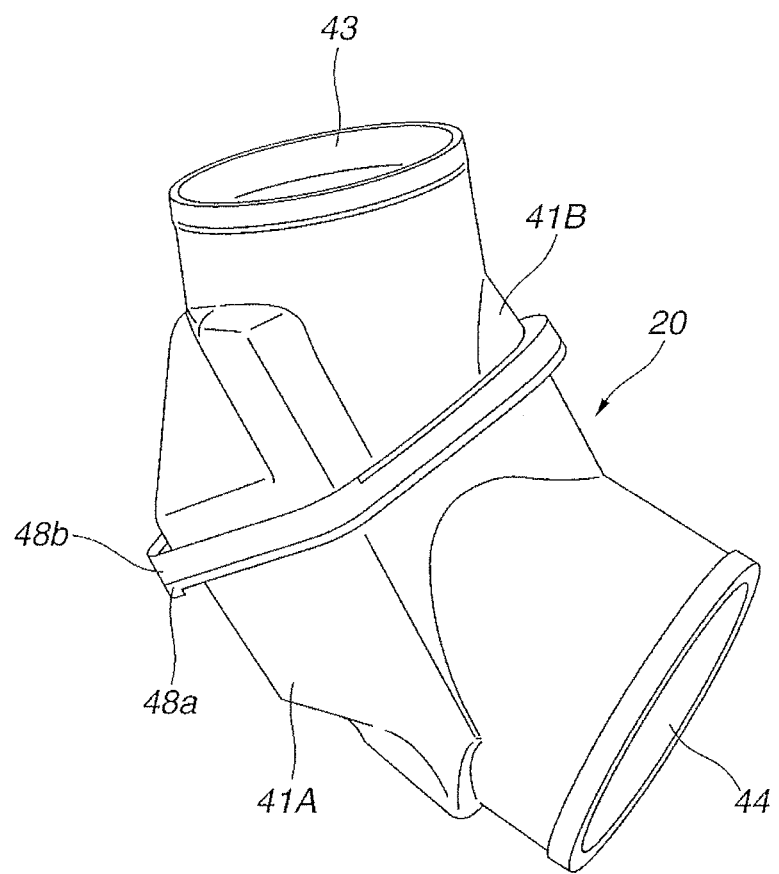
FIG. 5 A perspective view showing an outward appearance of the backflow preventer.

As also shown in FIGS. 4 and 5, backflow preventer 20 is provided to have casing 41 constituting an extended section so formed as to locally expand the cross-sectional area of the pathway of air intake pathway 8, and inner tube 42 is housed inside the casing 41.

Casing 41 is formed of a relatively hard synthetic resin the midsection of which is shaped cylindrically and rectangularly in cross section, and provided having cylindrically-shaped entrance section 43 at one end serving as the upstream end while having cylindrically-shaped exit section 44 at the other end serving as the downstream end. Entrance section 43 is connected to air intake duct 32. Meanwhile, exit section 44 is provided with an annularly-shaped sealing member 45 formed of a relatively soft synthetic resin and metal clamping band 46, and connected to an inlet of the above-mentioned supercharger 15 equipped with bypass pathway 17. Hence the mainstream of air intake is to flow from entrance section 43 toward exit section 44 in casing 41; however, casing 41 is formed beaded or curved at its midsection as shown in FIGS. 4 and 5 etc. in order to allow the mainstream of air intake to curvingly flow inside backflow preventer 20, so that the center axis of entrance section 43 and that of exit section 44 make an obtuse angle therebetween.

More specifically, casing 41 is composed of two parts, i.e., body section 41A constituting a downstream part including exit section 44 and cover section 41B constituting an upstream part including entrance section 43. Body section 41A and cover section 41B, which are mutually independently shaped, are joined to each other by a suitable means such as an adhesive and vibration welding at joining flanges 48a, 48b. Incidentally, body section 41A and cover section 41B are separated at a location relatively close to entrance section 43, and therefore the length of body section 41A is larger than that of cover section 41B.

Figure 6:
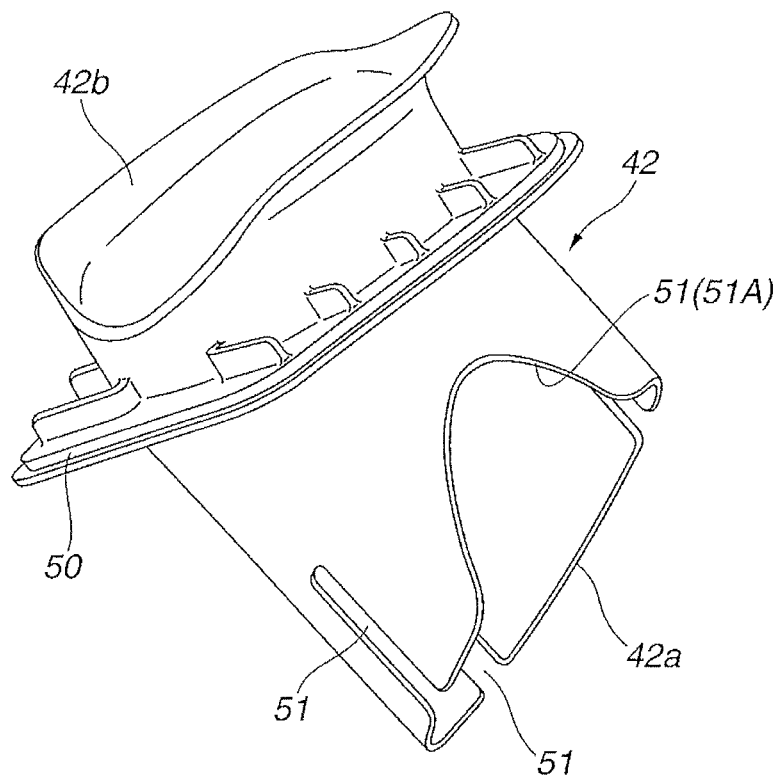
FIG. 6 A perspective view showing an inner tube alone.
Figure 7:
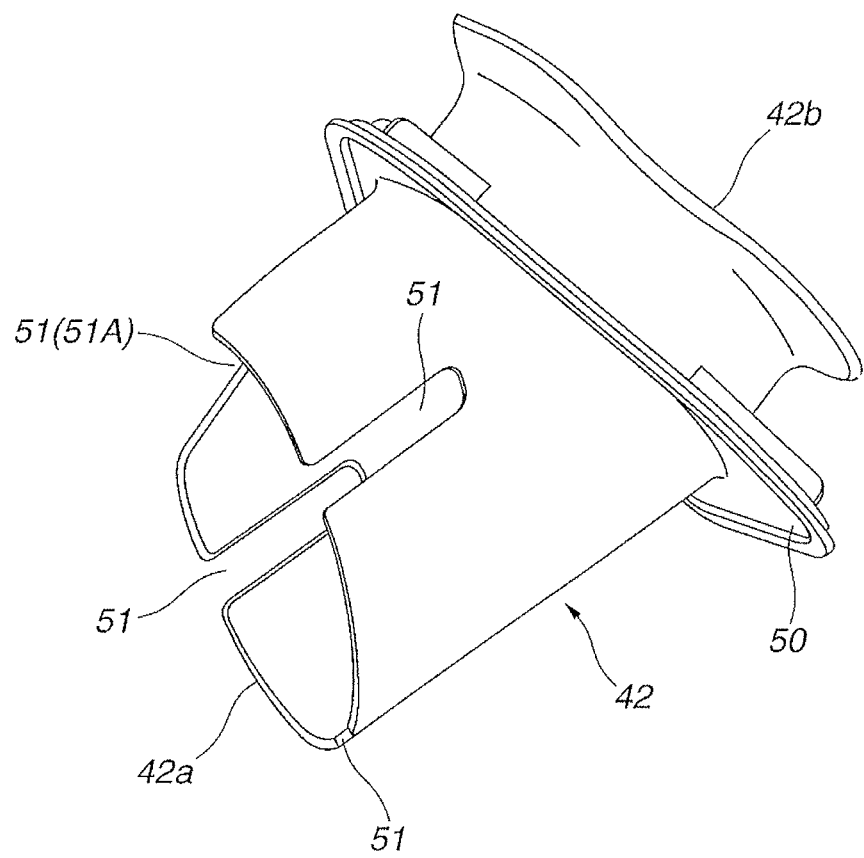
FIG. 7 A perspective view similarly showing the inner tube alone from a different direction.

FIGS. 6 and 7 show inner tube 42 to be housed in casing 41, as a single object. This inner tube 42 is integrally formed from a relatively hard synthetic resin, and basically, formed having a cylindrical shape the diameter of which is substantially equal to that of entrance section 43 or exit section 44 of casing 41 and formed having flange portion 50 as a partition at its longitudinal intermediate portion (more specifically, at a location relatively close to the upstream end). This flange portion 50 is provided extending in a direction substantially perpendicular to the center axis of inner tube 42 to have a mostly rectangular outside shape corresponding to the cross-sectional shape of the midsection of casing 41. As shown in FIG. 4, flange portion 50 is interposed between joining flanges 48a, 48b of body section 41A and cover section 41B and integrally joined thereto together with body section 41A and cover section 41B. With this, inner tube 42 is supported in the interior of casing 41.

FIG. 6 is a perspective view showing an inner tube alone from the same direction as in FIG. 5, wherein the illustrated inner tube 42 is formed slightly bended or curved to correspond to the bended or curved shape of the midsection of casing 41. At an end portion located on the side of downstream end 42a, four slits 51 extending along the center axis of inner tube 42 are formed every 90 degrees by cutting. Slit 51 provided on the outer peripheral side of the curve and a pair of slits 51 located on both sides are formed extended toward the upstream side at established intervals, while slit 51 located on the inner peripheral side of the curve (particularly indicated by a referential numeral 51A) is formed to be parabolically largely cut off in order to avoid the interference with the inner wall surface of casing 41. Though downstream end 42a of inner tube 42 has such a shape as to be obtained by simple cutting, upstream end 42b has a fluently expanding shape or the so-called horn shape in order to allow the intake air having flowed from the forward direction to enter smoothly.

In the state of being housed in casing 41, inner tube 42 is supported in casing 41 only by flange portion 50 as shown in FIG. 4 and therefore the other portions are apart from casing 41. Flange portion 50 serving as a partition defines entrance-side space section 53 inside cover section 41B of casing 41. Upstream end 42b of inner tube 42, which is formed expanded into the horn-like shape, is provided to open inside entrance-side space section 53. More specifically, upstream end 42b is so disposed as to face toward the opening plane of entrance section 43 of casing 41 through a slight clearance. Though the horn-shaped upstream end 42b is close to the inner wall surface of casing 41 due to its horn-like shape, upstream end 42b is apart from the inner wall surface of casing 41 all over its circumference.

Downstream end 42a having a linearly-cut shape is provided to open in the interior of body section 41A of casing 41, and so disposed as to face toward the opening plane of exit section 44 of casing 41 through a slight clearance. Downstream end 42a is also apart from the inner wall surface of casing 41, all over its circumference.

Namely, the cylindrically-shaped inner tube 42 is provided extending from flange portion 50 toward entrance section 43 while extending from flange portion 50 toward exit section 44, to substantially construct a duct for the mainstream of air intake flowing from entrance section 43 to exit section 44. Each of the ends of inner tube 42 behaves as a free end in the interior of casing 41.

As a result of inner tube 42 being supported in the interior of casing 41 by flange portion 50 as mentioned above, exit-side space section 55 is defined continuously all over the circumference, in the interior of body section 41A disposed downstream from flange portion 50, between the outer peripheral surface of inner tube 42 and the inner wall surface of casing 41. Exit-side space section 55 is provided such that its downstream side is open all over its circumference through a gap between downstream end 42a of inner tube 42 and the inner wall surface of casing 41 while its upstream side is closed by flange portion 50 behaving as a partition. In other words, exit-side space section 55 is a cylindrically-defined space one end of which is closed, and communicates with an interior space of inner tube 42 through slits 51 of inner tube 42.

As shown in FIG. 4, the midsection of casing 41 has a part corresponding to the outside (or outer peripheral side) of the curve which part is formed expanded greatly as compared with the inside (or inner peripheral side) of the curve, while inner tube 42 is loosely curved. Consequently, exit-side space section 55 is so configured that the volume of the part corresponding to the outside of the curve is larger than the volume of the part corresponding to the inside of the curve. In other words, if exit-side space section 55 is viewed in cross section perpendicular to the center axis of inner tube 42, the cross-sectional area of the outside of the curve is relatively larger than the cross-sectional area of the inside of the curve.

In the above-mentioned arrangement, when the intake air flows in the forward direction from air cleaner 9 toward internal combustion engine 1, the intake air is to flow from entrance section 43 of casing 41 to inner tube 42, and subsequently flows from downstream end 42a of inner tube 42 to exit section 44. Namely, inner tube 42 substantially behaves as a duct inside which the intake air flows in the forward direction, so that there is no particular increase in intake resistance. Since inner tube 42 is shaped like a horn at upstream end 42b, the intake air stream flowing in the forward direction is infallibly captured thereby suppressing the increase of intake resistance at entrance-side space section 53. In this case where the intake air stream flows in the forward direction, exit-side space section 55 and entrance-side space section 53 are also capable of functioning as a silencer for suppressing pulsation noise.

Meanwhile, in the state where bypass valve 18 opens to allow the intake air to cycle through bypass pathway 17, the intake air tends to flow back toward air cleaner 9; however, this backflow is prevented by backflow preventer 20. More specifically, though a part of the intake air which tends to flow from exit section 44 in the backward direction inevitably enters into the interior of inner tube 42 through downstream end 42a at exit section 44, another part of the intake air enters into exit-side space section 55 through the gap defined at the outer periphery of inner tube 42. In particular since backflow preventer 20 is arranged to allow the mainstream of air intake to flow curvingly, the intake air stream flowing in a straight line from exit section 44 is to enter mostly into the outer peripheral side of the curve of exit-side space section 55. The intake air thus incorporated in exit-side space section 55 is blocked from flowing by flange portion 50 behaving like a partition and therefore cannot flow up to the side of air cleaner 9. Additionally, a part of the intake air having entered into the interior of inner tube 42 is similarly blocked from flowing back to the upstream side. Though most of the intake air stream are to gather at the outer peripheral side of the curve of exit-side space section 55, this region is provided to have a cross-sectional area larger than that of the inner peripheral side of the curve and accordingly backflow components are sufficiently received and never be spilled out of inner tube 42.

Hence a very few backflow components can reach air flow meter 10 through inner tube 42. With this, measurement errors in air flow meter 10 are reduced. In addition, the intake air having passed through inner tube 42 is to expand in entrance-side space section 53 wherein upstream end 42b of inner tube 42 opens, so that pulsation components caused by the backflow are more certainly decreased.

In the above-mentioned example, inner tube 42 is provided to ensure a relatively long length of its downstream part while guiding the backflow of the intake air into exit-side space section 55 by slits 51; therefore, the guide for forwardly-flowing intake air mainstream and the capture of backflow components are both attained at a high level. Since inner tube 42 is long as compared with a case where slits 51 are not provided and the length of the downstream part of inner tube 42 is shortened according thereto, it is possible to guide the intake air mainstream smoothly along the curved shape at the time when the intake air flows in the forward direction, and an intake air stream having once entered into exit-side space section 55 at the time of backflow can be suppressed from spilling out of exit-side space section 55.

The present invention can be applied also to a diesel engine not equipped with throttle valve 5.

The invention claimed is:

1. An air intake pathway structure for internal combustion engine, the internal combustion engine equipped with a supercharger downstream from an air flow meter in an air intake pathway and equipped with a bypass pathway and a bypass valve for allowing downstream and upstream sides of the supercharger to come in communication with each other, the structure comprising:

an extended section formed by locally expanding the cross-sectional area of the pathway and located at a part of the air intake pathway and between a meeting point where the air intake pathway meets the bypass pathway and the air flow meter; and an inner tube inside the extended section, the downstream end of which is formed opening toward an exit section of the extended section, wherein the inner tube and an inner wall surface of the extended section define a space section therebetween, the space section having an upstream side blocked by a partition and a downstream side opening inside the extended section.

2. An air intake pathway structure for internal combustion engine, as claimed in claim 1, wherein the extended section is disposed at a curved portion of the air intake pathway where the direction of the mainstream of air intake changes.

3. An air intake pathway structure for internal combustion engine, as claimed in claim 2, wherein the volume that the space section has at the outside of its curve is relatively larger than the volume that the space section has at the inside of its curve.

4. An air intake pathway structure for internal combustion engine, as claimed in claim 1, wherein the inner tube is provided having, at its downstream end, slits extending along the direction of the mainstream of air intake.

5. An air intake pathway structure for internal combustion engine, as claimed in claim 1, wherein the inner tube is formed extending further from the partition toward the upstream side, and opens at its upstream end within a second space section defined between the extended section and the partition.

6. An air intake pathway structure for internal combustion engine, as claimed in claim 5, wherein the upstream end of the inner tube is shaped like a horn.

\* \* \* \* \*